Oct. 25, 1955  E. H. WIEMERI  2,721,381
PIERCING DEVICES
Filed June 2, 1955
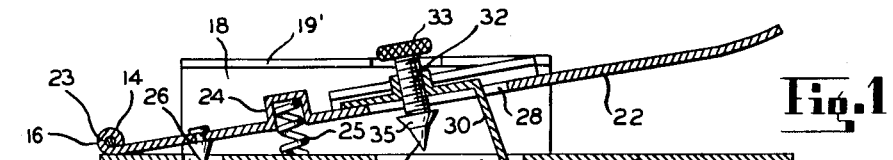
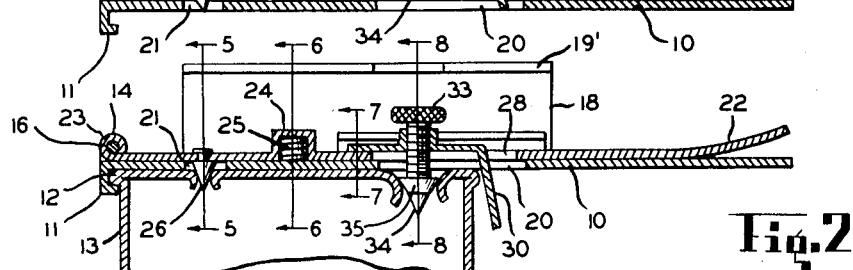
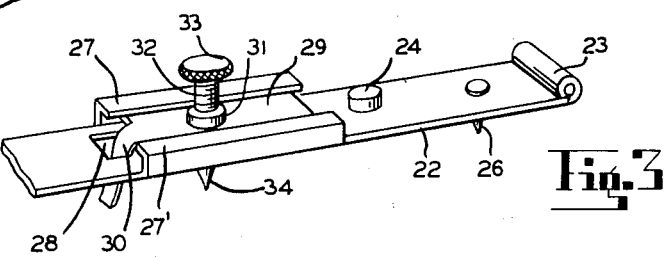
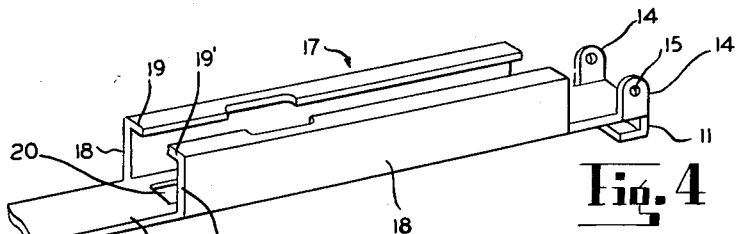
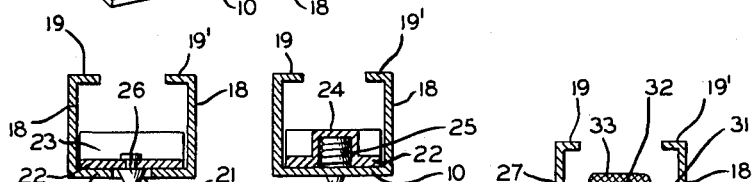
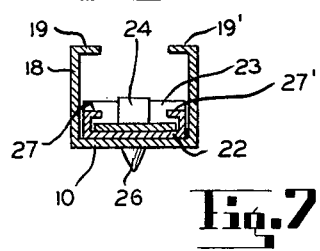
*INVENTOR.*
EINO H. WIEMERI
BY
PARKER & CARTER
ATTORNEYS United States Patent Office 2,721,381
Patented Oct. 25, 1955

2,721,381

PIERCING DEVICES

Eino H. Wiemeri, Milwaukee, Wis.

Application June 2, 1955, Serial No. 512,737

6 Claims. (Cl. 30—6.1)

My invention relates to piercing devices and more particularly to a lever arrangement for piercing a vent and a pouring aperture through the cover of a sealed can or container.

One object of my invention is to provide a means of securely aligning the piercing lever in engagement with the receptacle cover, during the piercing operation.

Another object of my invention is to provide a piercing device that employs lever action, for ease in its manipulation.

Still another object of my invention is to construct a device of the character described in a manner to prevent the operator from pinching fingers during the piercing operation.

A further object of my invention is to provide a device that is adjustable to fit containers of varied diameters, and for varying the distance between the apertures being pierced.

A still further object of my invention is to provide a device that permits the apertures to be varied in size and in which the piercing prongs are adjustable and controlled by the operator.

It is manifest to anyone familiar with piercing containers, such as milk cans or beverage cans, that it is imperative to provide two openings so that the air is permitted to enter the one while the contents of the can are being poured from the other. It is the prime object of my invention, therefore, to provide a device that fits cans or containers of various diameters, the device having a pivoted lever provided with a fixed piercing prong and another piercing prong that may be slidably adjusted on the lever for locating the pouring aperture, and is threadedly supported to adjust the size of the aperture being pierced for pouring.

The device is simple and inexpensive, safe and easy to manipulate.

Other and further objects of my invention will become more apparent as the description proceeds when taken in conjunction with the drawings, in which:

Figure 1 is a longitudinal cross sectional view of the device in an open, disengaged position.

Figure 2 is a view similar to that shown in Figure 1, but with the device engaging a container, and the device in position for piercing the two apertures in the cover thereof.

Figure 3 is a perspective view of the upper lever member supporting the piercing prongs.

Figure 4 is a perspective view of the lower lever or base member adapted for engagement with the top of the container being pierced.

Figure 5 is a transverse detail section of the assembled device, taken on line 5—5 of Figure 2.

Figure 6 is a transverse section taken on line 6—6 of Figure 2.

Figure 7 is a transverse section of the assembled device taken on line 7—7 of Figure 2; and Figure 8 is a transverse section taken on line 8—8 of Figure 2.

Referring now to details of the embodiment of my invention shown in the drawing, 10 indicates a lever or base member which may be made of flat steel or the like and which has a downwardly disposed hook or channel 11 at one end for engagement with the marginal bead 12 of a can 13.

The lever 10 also has a pair of upstanding hinge supports 14 adjacent the hook 11 which have apertures 15 therein for receiving a hinge pin 16.

The lever 10 has an upstanding channelled housing 17 intermediate its ends, including upwardly bent vertical walls 18 with inturned opposed horizontal flanges 19 and 19' integrally formed therewith. The lever has a rectangular opening 20 in its base portion within but adjacent the outer end of the housing 17. A smaller opening 21, preferably circular in shape, extends through the base plate of lever 10 near the inner end of the housing 17.

A top lever 22 constructed of steel or the like is hinged to the lower lever by an eye 23 for the pivot pin 16. This eye fits between the hinge supports 14 in the lower lever 10 and forms a fulcrum for the top lever 22.

The top lever 22 passes through the housing 17 of the lower lever 10 and is guided for limited vertical movement by the side walls 18 and flanges 19 of said housing. The top lever 22 has an upwardly extending, downwardly opening hollow boss 24 for receiving a coil spring 25 therein, which is adapted to engage the top surface of the lower lever 10.

The upper lever 22 has a vent piercing prong 26 near its hinged end, adapted to register with the aperture 21 in the lower lever. Said upper lever has channels 27 and 27' extending outward and upward along its side edges intermediate the ends thereof. An elongated opening 28 is formed in said upper lever between the channels 27 and 27'. A plate 29 is slidably supported on the top of lever 22 between the channels 27 and 27'. Said plate has a downwardly extending portion 30 at its outer end adapted to project through the opening 28. An upwardly extending collar 31 is formed intermediate the ends of the plate 29 which is threaded for engagement by a screw 32 having a knurled head 33 at the top, and carrying the piercing means at its lower end, which means, as herein shown, consists of a small conical head portion 34 at its bottom end, and a superposed, more widely flared tapered head portion 35 of larger diameter, for varying the sizes of the opening or apertures to be pierced through the can. The downwardly extending portion 30 of the plate 29 is preferably inclined forwardly for engagement with the outer edge of the container 13 in opposite relation to the clamping channel 11 when the lower plate 10 is secured on the can.

In operation, the lower lever 10 is placed into engagement with the upper flat surface of the can 13 so that the channel 11 is disposed over the bead 12 on the upper periphery of said container. The operator then moves the plate 29 in the channels 27 and 27' of the upper lever 22 so that the downwardly disposed guide member 30 contacts the rim or head of the can at a point opposite to the channel 11. When the upper lever 22 is pressed downwardly, the piercing point 26 will enter and pierce the cover of the can, to form a vent near one edge thereof, while the adjustable piercing points 34 and 35 will pierce the cover of the can to form a pouring aperture near the opposite edge thereof. The size of the pouring aperture may be varied as desired by adjusting the threaded screw 32 on which the joints 34 and 35 are mounted.

The downwardly disposed guide member 30 of the plate 29 will engage the outer edge of the can 13 to aid in moving the points 34 and 35 in proper position to form the pouring aperture.

With the guide member 30 inclined downwardly and outwardly as shown, the operator may, by initially engaging the outer end of said member with the adjacent edge of the can top, cause the plate 29, with the piercing points 34 and 35 carried thereby, to slide outwardly as the upper lever is brought downward, resulting in the formation of a radially-elongated aperture in the can top, a shape especially suitable for pouring liquid from the latter.

Inasmuch as the top lever 22 is hingedly attached to the lower lever 10 and is disposed within the upwardly extending channel 17 of the lower lever 10, the coil spring 25 in recess 24 of the upper lever 22, contacting the upper surface of the lower lever 10, will cause the upper lever 22 to be retained in a raised position at all times until pressure is placed on the outwardly extending end of the top lever 22 for piercing the apertures.

With the exception of the opposed outer ends of the upper and lower levers 10 and 22 which are designed to be grasped by the hand when said levers are pressed together, the moving parts of the device are enclosed in the housing 17 to protect the user from pinched fingers.

Although I have shown and described certain embodiments of my invention, it will be understood that I do not wish to be limited to the exact construction shown and described but that various changes and modifications may be made without departing from the spirit and scope of the invention as defined by the appended claims.

I claim:

1. In a piercing device for cans and the like, a lower lever and an upper lever hinged together at one end, means affording limited yielding movement of said levers toward and away from each other, a hook on the hinged end of the lower lever for engaging a bead on the periphery of a can top, two piercing members spaced along said upper lever intermediate the ends thereof, the piercing member farthest from the hinged end of said levers being guided for slidable movement along said upper lever, a guide member movable with said slidable piercing member adapted for engagement with the edge of a can top for positioning said slidable piercing member in predetermined operative position adjacent said can top edge, and the lower lever having openings therethrough permitting engagement of said piercing members and said guide member with the can top when the lever is engaged along the can top.

2. The structure of claim 1, wherein the lower lever has an upstanding hollow housing extending therealong intermediate the ends thereof to enclose the slidable piercing member and its associated guide member.

3. The structure of claim 1, wherein the slidable guide member comprises a plate, its associated piercing member is mounted on the lower end of an upright stem threaded in said plate and having a knurled head at its upper end for vertical adjustment of said piercing member, and the housing has an opening permitting access to said knurled head.

4. The structure of claim 1, wherein the slidable guide member comprises a plate slidably mounted between channelled guides on the upper lever, the guide member is integral with and bent downwardly from the end of said plate, and the piercing member associated therewith consists of an adjusting screw passing through the plate with a piercing point on its lower end, and a knurled adjusting nut on its upper end.

5. The structure in accordance with claim 1, wherein the lower lever has upstanding side walls intermediate its ends within which the upper lever is guided in its movement toward and away from the lower lever, said side walls forming an enclosure for the piercing members on the upper lever, and also having inwardly flanged upper margins forming a stop to limit vertical hinged movement of the upper lever.

6. The structure of claim 1, wherein the guide member includes a downward and outward extension adapted to cause said slidable piercing member to make a radially elongated cut in the can top as the slidable piercing member is pressed into said can top.

No references cited.